United States Patent [19]
Zeidler et al.

[11] 4,062,043
[45] Dec. 6, 1977

[54] APPARATUS FOR DISTRIBUTING LIGHT SIGNALS AMONG A PLURALITY OF RECEIVERS

[75] Inventors: Güenter Zeidler, Unterpfaffenhofen; Franz Auracher, Munich, both of Germany

[73] Assignee: Siemens Aktiengesellschaft, Berlin & Munich, Germany

[21] Appl. No.: 561,843

[22] Filed: Mar. 25, 1975

[30] Foreign Application Priority Data

Mar. 28, 1974 Germany .............................. 2415046

[51] Int. Cl.² .......................... H04N 7/18; H04B 9/00
[52] U.S. Cl. ........................................ 358/86; 250/199
[58] Field of Search ............................. 250/199, 227; 178/DIG. 2, DIG. 13, DIG. 1; 340/380; 350/96 R, 96 B, 96 C, 96 WG, 169, 171, 172; 325/308; 358/86

[56] References Cited

U.S. PATENT DOCUMENTS

| | | | |
|---|---|---|---|
| 2,506,672 | 5/1950 | Kell et al. | 250/199 |
| 3,267,385 | 8/1966 | Ashkin | 250/199 |
| 3,331,651 | 7/1967 | Sterzer | 250/199 |
| 3,536,922 | 10/1970 | Ito | 250/199 |
| 3,566,127 | 2/1971 | Hafner | 250/199 |
| 3,590,248 | 6/1971 | Chatterton | 250/199 |
| 3,635,545 | 1/1972 | Van Kerkhove | 350/169 |
| 3,751,670 | 8/1973 | Grooner | 250/199 |
| 3,756,688 | 9/1973 | Hudson et al. | 250/199 |
| 3,761,716 | 9/1973 | Kapron et al. | 250/199 |
| 3,833,893 | 9/1974 | Rajchman | 250/199 |
| 3,838,278 | 9/1974 | Duguay | 250/199 |
| 3,883,217 | 5/1975 | Love et al. | 350/96 WG |
| 3,883,222 | 5/1975 | Gunderson | 350/96 C |
| 3,892,468 | 7/1975 | Duguay | 250/227 |
| 3,901,581 | 8/1975 | Theil | 350/96 WG |

FOREIGN PATENT DOCUMENTS 1,022,323 1966 United Kingdom .................. 250/199

OTHER PUBLICATIONS

Osipov, "Multichannel Splitting of a Laser Beam by Means of a Fly's-Eye Lens," *Optical Technology*, vol. 40, No. 11, Nov. 1973, pp. 671-673.

*Primary Examiner*—John C. Martin
*Attorney, Agent, or Firm*—Hill, Gross, Simpson, Van Santen, Steadman, Chiara & Simpson

[57] ABSTRACT

An optical transmitter, a plurality of optical receivers and light wave guides operatively interconnecting the transmitter and receivers. In one embodiment the transmitter has a light emission surface in the order of a plurality of light wave guide cross-sections and the ends of the light wave guides thereadjacent are disposed in close side-by-side relation to one another and in close proximity to the light emission surface of the transmitter. In other embodiments the transmitter has a light emission surface in the order of a single light wave guide cross-section and interposed between the light emission surface and the light wave guides is an optics system.

2 Claims, 10 Drawing Figures

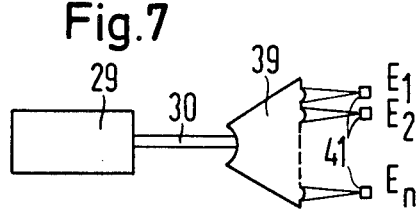
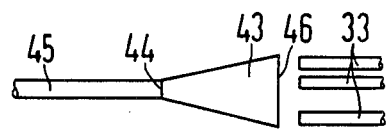
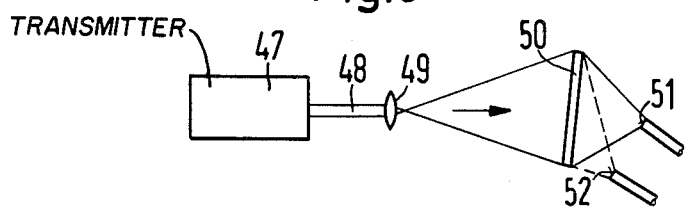
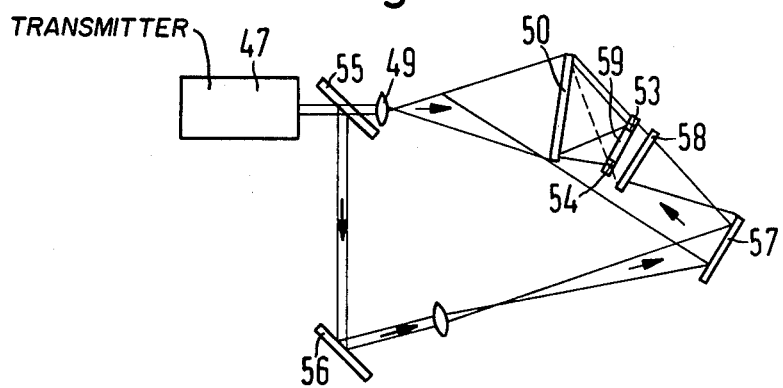

APPARATUS FOR DISTRIBUTING LIGHT SIGNALS AMONG A PLURALITY OF RECEIVERS

BACKGROUND OF THE INVENTION

This invention relates generally to the field of light wave transmission and distribution systems and more particularly to a system in which at least one optical transmitter is used to distribute television programming or the like to a plurality of receivers through light conducting fibers.

Systems such as that generally described are known and involve the utilization of a connection plug or coupling which serves to connect an incoming light conducting fiber to a plurality of outgoing light conducting fibers. Such systems do not use any optical focusing devices, however, and as a consequence there occurs at the coupling a loss of at least some portion of light energy being transmitted.

To avoid this loss and to provide a light distribution system in which virtually all of the total light energy emitted from the transmitter is utilized are among thre principle aims of the present invention.

SUMMARY OF THE INVENTION

One aspect of the present invention may be described generally as involving a transmission and distributor system which includes a transmitter having a light transmission area in the order of several cross-sections of a light wave guide, and a plurality of light wave guides leading respectively to a corresponding plurality of receivers, with the ends of the light wave guides which are operatively connected to the transmitter being arranged in a group or side-by-side relationship and disposed closely adjacent to or close proximity to the light emission area of the transmitter.

Another aspect of the invention resides in summary in the provision of a transmitter having a light transmission area in the order of only one cross-sectional area of a light wave guide, but includes a beam-expanding optics device disposed between the ends of the light wave guides adjacent the transmitter and the transmitter light emission area.

The optics device may conveniently take the form of a lens system which, in a simple version, includes a concave lens followed in the direction of transmission of the light beam by a convex lens.

Among the other beam-expanding optics devices which fall within the ambit of the present invention involves one which comprises a partially transmissive reflector system wherein, for the purpose of increasing the input coupling efficiency of the light beams which are received by the associated light wave guides, the reflectors are concave.

Another and equally efficient coupling arrangement or optics device involves a convex lens followed by a fly-eye lens such that the light beams transmitted through the fly-eye lens are focused directly onto the light inlet surfaces of the respective associated light wave guides.

It should be understood, of course, that the light wave guides can be eliminated in favor of transmitting the light beams directly from the fly-eye lens to the receivers, assuming the receivers are sufficiently proximately disposed with respect to the fly-eye lens.

In situations wherein it may be desirable or even essential to employ a light distributor which is insensitive to vibration, the beam-expanding optic device may be tapered in configurative form. In addition, a hologram can be advantageously utilized as the optics system in situations wherein a light beam from a fixed direction is to focused onto a plurality of light wave guides which are irregularly distributed in space.

Additional details and features of the present invention, along with other objects and advantages thereof, will be readily apparent from the following description of preferred embodiments thereof, taken in conjunction with the accompanying drawings, although variations and modifications may be effected without departing from the spirit and scope of the novel concepts disclosed herein.

BRIEF DESCRIPTION OF THE DRAWING

FIG. 7 discloses another embodiment of a small-area light emission distributor in which the convex lens and the fly-eye lens of the embodiment shown in FIG. 6 are effectively confined in a unitary structure.

FIG. 8 discloses another embodiment, particularly insensitive to vibration, in which a diverging or tapered optical member is connected in fixed assembly to an incoming light wave guide.

FIG. 9 discloses another embodiment of a small light emission area transmitter involving a hologram.

FIG. 10 discloses schematically an arrangement particularly suitable for the production of the hologram assembly shown in FIG. 9.

DESCRIPTION OF THE PREFERRED EMBODIMENTS

Figure 1:
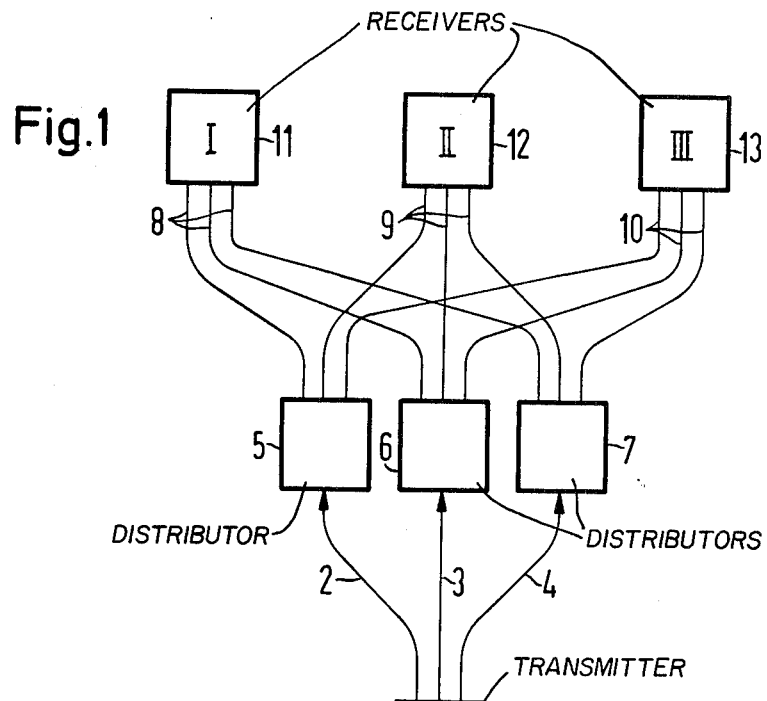
FIG. 1 illustrates schematically a light transmission and distribution system, constructed in accordance with the principles of the present invention.

FIG. 1 illustrates diagrammatically a transmission and a distribution system constructed in accordance with the principles of the present invention. The system illustrated in FIG. 1 may be arranged, for example, for three-channel television programming and comprises a transmitter 1 and plurality of television receivers 11, 12 and 13, all of which may be located within a single building or may be similarly somewhat proximately disposed with respect to one another. The transmitter 1 may be operated electrically or optically from a remote transmitting station, and leading from the transmitter 1 are three light conducting cables or fibers 2, 3 and 4, each of which may transmit a signal corresponding to a single television program.

The light conducting cables 2, 3 and 4 are connected respectively to optical distributors 5, 6 and 7, whereby the optical signals emitted from the transmitter 1 are conducted through the cables 2, 3 and 4 and thence to the distributors 5, 6 and 7, from whence they are conducted to the television receivers 11, 12 and 13 by virtue of a plurality of light wave guides 8, 9 and 10. By virtue of this arrangement the television receivers 11, 12 and 13 may each selectively receive any one of the three television programs being transmitted thereto.

The transmitter 1 comprises three outputs at which are respectively installed three laser diodes which may be, for example, of the gallium arsenide type, for the production of modulated light waves, the emitted light beams of which are conducted directly into the cables 2, 3 and 4. These light beams, which may contain both video and sound signals, constitute the operating signals for the three receivers 11, 12 and 13, depending upon the particular channel selected for each of the receivers 11, 12 and 13.

Figure 2:
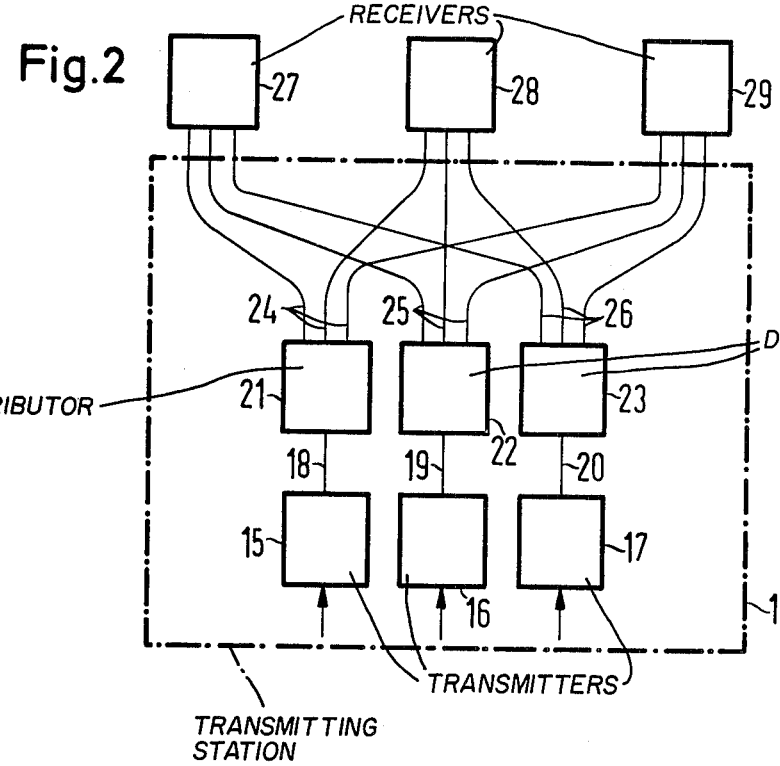
FIG. 2 is similar to FIG. 1 but discloses another embodiment of the invention.

FIG. 2 illustrates another embodiment of the invention and comprises a television transmission system involving a plurality of receivers arranged in widely distributed fashion about a transmitting station indicated generally at reference numeral 14. The transmitting station 14 comprises three light transmitters 15, 16 and 17 which respectively conduct three television programs through optical channels 18, 19 and 20 to a corresponding plurality of optical distributors 21, 22 and 23. Leading from each of the distributors 21, 22 and 23 are three light wave guides, which are indicated in groups of three at reference numerals 24, 25, and 26 respectively. The light wave guides 24, 25 and 26 are indicated as being operatively connected to a corresponding plurality of television receivers 27, 28 and 29, each of which is capable of receiving all three of the programs being transmitted by the light wave guides 24, 25 and 26. Intermediate amplifiers may, of course, be arranged within the light wave guides 24, 25 and 26 if necessary to provide satisfactory transmission.

By virtue of the embodiment shown in FIGS. 1 and 2, alpha-numerical data or video signals can be transmitted, instead of television programs, from a transmitting station to a plurality of receivers via mono- or multimode-light wave guides.

In lieu of the light wave guides 24, 25 and 26 are shown in FIG. 2, which adjoin the distributors 21, 22, and 23, light detectors may be advantageoulsy utilized in situations in which detectors and the distributors can be installed in close proximity to one another.

Figure 3:
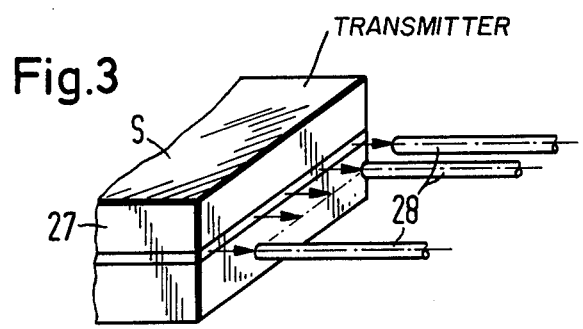
FIG. 3 is a somewhat schematic, enlarged fragmentary perspective view of a distributor constructed in accordance with the present invention to provide large area light emission.

In the event the light emission surfaces of the transmitters, such as transmitter 1 in FIG. 1 or transmitters 15, 16 and 17 of FIG. 2, have areas equal to a plurality of end faces of the outgoing optical light wave guides 2, 3 and 4 of FIG. 1, or 18, 19 and 20 of FIG. 2, as exists for example in situations where a gallium arsenide laser diode is utilized, as shown for example in FIG. 3, the outgoing light wave guides as shown, for example, at reference numeral 28 in FIG. 3, or light detectors may be arranged or disposed next to one another in side-by-side relation, with the receiving ends thereof closely adjacent the emission surface of the transmitter 27. Preferably, the plurality of light waveguides have a total cross-sectional area no greater than the area of the emission surface.

In situations involving a transmitter having a small light emission surface, for example, a surface having an area in the order of one light waveguide cross-section an expanding optics arrangement may be disposed beyond the transmitter in the direction of propagation of the light beam.

Figure 4:
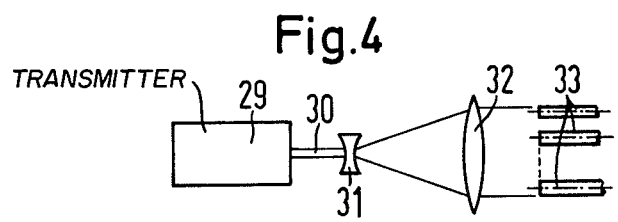
FIG. 4 illustrates schematically another embodiment for providing small-area light emission in which, in the path of the light beams, a concave lens is followed by a convex lens.

For example, FIG. 4 illustrates a ruby laser 29 in which the emitted radiation, indicated at reference numeral 30, is conducted to a biconcave lens 31 and thence to a biconvex lens 32. The lens 32 adjusts the direction of the radiation emitted from the tramitter 29 to a parallel beam, and is input-coupled to a plurality of light wave guides 33.

Figure 5:
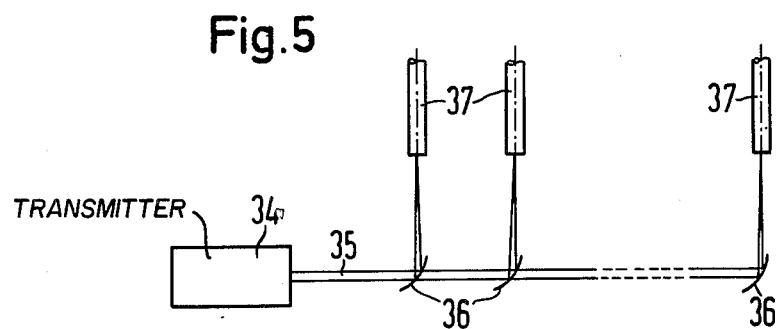
FIG. 5 discloses another small-area light emission distributor which includes partially transmissive reflectors.

FIG. 5 is also illustrative of an arrangement whereby a collimated light beam 35 is focused from a transmitter 34 via a plurality of partially transmissive concave reflectors 36, and thence onto the adjacent ends of a corresponding plurality of light wave guides 37. By virtue of this arrangement a high degree of input coupling efficiency of the transmitted light into each of the light wave guides 33 is ensured. The degree of reflection of the partially transmissive reflectors 36 can be predetermined, whereby a selective light intensity may be input-coupled into each of the light wave guides 33.

Figure 6:
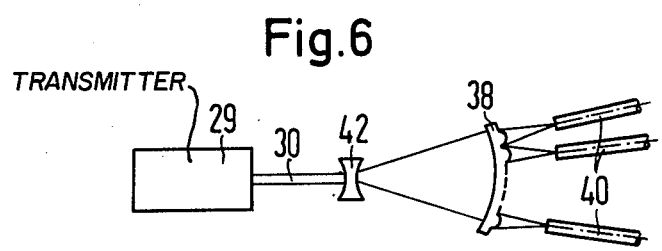
FIG. 6 discloses schematically another embodiment of the invention in which a convex lens is followed by a fly-eye lens in the direction of the path of travel of the light beams.

FIGS. 6 and 7 are illustrative of embodiments wherein a light beam indicated at reference numeral 30, emitted from a transmitter 29 is placed in focus by virtue of a fly-eye lens. In the embodiment shown in FIG. 6 the light beam 30 is first expanded by a biconcave lens 42 illuminating the concave surface $38_a$ of a fly-eye lens 38. From the lens 38 the beams are focussed to the end faces of a plurality of outgoing light wave guides 40.

In the embodiment shown in FIG. 7, the biconcave lens and the fly-eye lens are combined as indicated at reference numeral 39, the beams being transmitted thereby being received by a plurality of photo-detectors indicated at reference numeral 41, the number of photo-detectors being selectable as indicated at reference characters $E_1$, $E_2$ and $E_n$.

FIG. 8 is illustrative of an expanding optics system which is particularly insensitive to vibration. As illustrated therein, an input surface 44 of a optical component 43 is coupled to an incoming light wave guide 45, with an output surface 46 of the tapered component 43 being arranged closely adjacent the end faces of a plurality of outgoing light wave guides 33. The component 43 comprises a tapered wave guide element having a cross-section which increases in the direction of the beam.

FIG. 9 is illustrative of another embodiment of the present invention in which a hologram constitutes a portion of the expanding optics system. As shown, a laser transmitter 47 focuses a closely grouped or bunched light beam indicated at reference numeral 48 through a convex lens 49 onto a hologram 50, the latter possessing an interference pattern which deflects the light beams which pass through precisely into the entry surfaces 51 and 52 of adjoining or associated light wave guides $51_a$ and $52_a$.

An advantageous arrangement for the production of the hologram indicated at reference numeral 50 in FIG. 9 shall be described making reference to the arrangement schematically illustrated in FIG. 10, in which the positions of the laser transmitter 47, the lens 49, the photo plate 50 and openings 53 and 54 in a grid plate 59 correspond with the positions of the similarly numbered components 47, 49, 50, 51 and 52 of the embodiment illustrated in FIG. 9. The narrow light beam which issues from the laser transmitter 47 is partially deflected by a semitransparent reflector 55, and additionally by deflectors 56 and 57, in a manner whereby the fraction of the beam which passes through the semitransparent reflector 55 forms the reference beam directly on the photo plate 50, and the beam component which is deflected by the reflectors 56 and 57 to abut the opposite surface of the photo plate 50 forms the object beam for the production of a hologram.

In the direction of the beam between the photo plate 50 and the reflector 57 is a diffusor 58 which provides for a uniform illumination of the grid plate 59. The latter plate 59 contains the same number of openings at points at which on the reconstruction of the thus formed hologram, with the laser transmitter 47, the lens 49 and the end faces 51 and 52 of the adjoining light wave guides $51_a$ and $52_a$ of FIG. 9, are arranged. An advantage of the arrangement disclosed in FIG. 10 resides in the fact that the laser transmitter 47 may be employed for the production of the hologram 50 can also be thereafter utilized as a transmitter of a data transmission system as mentioned hereinabove, and additionally can be utilized as a light distributor. No subsequent adjustment of the laser transmitter 47 and the hologram 50 in relation to one another is required. After the hologram has been produced it is merely necessary to bring the adjoining end faces 51 and 52 of the light wave guides $51_a$ and $52_a$ into positions which correspond respectively to the grid openings 53 and 54.

The latter mentioned adjustment will be superfluous if the illumination of the photo plate in the production of the hologram is effected via the light wave guides which adjoin this hologram and lead to the receivers. In that situation, however, the laser transmitter must be adjusted in relation to the hologram.

It will be appreciated that all of the reflection losses of the light on the various components which are employed in connection with the distributor can be maintained at a low level be conventional methods such as optical coating or immersion in a liquid material having a suitable index of refraction.

Although minor modifications might be suggested by those versed in the art, it should be understood that I wish to embody within the scope of the patent warranted hereon all such modifications as reasonably come within the scope of my contribution to the art.

What we claim is:

1. Apparatus for the distribution of light signals from at least one optical transmitter to a plurality of receivers for the distribution of television programs among a plurality of television receivers comprising an optical transmitter having a light emission surface in the order of one light wave guide cross-section, a plurality of light wave guides for operatively interconnecting said optical transmitter with a plurality of optical receivers, and a beam-expanding optics disposed between the light emission surface of said optical transmitter and one of the ends of each of said light wave guides, said optics comprising a partially transmissive reflector system having concave reflectors.

2. Apparatus for the distribution of light signals from at least one laser transmitter to a plurality of receivers for the distribution of television programs among a plurality of television receivers comprising a diode having a light emitting surface, a plurality of light wave guide cross-sections having a total area no greater than the area of said light emitting surface, a plurality of optical receivers, and a plurality of light wave guides corresponding in number to the number of said light wave guide cross-sections for operatively interconnecting said laser transmitter and said optical receivers, the ends of said light wave guides which are operatively connected to said diode being disposed in close side-by-side relation to one another and in close proximity to the light emitting surface of said diode.

* * * * *